United States Patent
Barbouteau et al.

(10) Patent No.: US 9,944,777 B2
(45) Date of Patent: Apr. 17, 2018

(54) RUBBER COMPOSITION WITH HIGH PROCESSABILITY FOR RUN-FLAT TIRE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Joel Barbouteau, Clermont-Ferrand (FR); Karim El-Othmani, Clermont-Ferrand (FR)

(73) Assignee: Compagnie Generale Des Etablissements Michelin, Clermont-Ferrand (FR)

(*) Notice: Subject to any disclaimer, the term of this patent is extended or adjusted under 35 U.S.C. 154(b) by 0 days.

(21) Appl. No.: 14/891,005

(22) PCT Filed: May 13, 2014

(86) PCT No.: PCT/EP2014/059694
§ 371 (c)(1),
(2) Date: Nov. 13, 2015

(87) PCT Pub. No.: WO2014/184159
PCT Pub. Date: Nov. 20, 2014

(65) Prior Publication Data
US 2016/0083567 A1    Mar. 24, 2016

(30) Foreign Application Priority Data
May 13, 2013 (FR) ...................... 13 54245

(51) Int. Cl.
*B60C 9/00* (2006.01)
*C08L 9/00* (2006.01)
*B60C 15/00* (2006.01)
*B60C 17/00* (2006.01)
*B60C 9/08* (2006.01)
*B60C 1/00* (2006.01)
*B60C 9/02* (2006.01)
*B60C 9/04* (2006.01)

(52) U.S. Cl.
CPC ............... *C08L 9/00* (2013.01); *B60C 1/00* (2013.01); *B60C 9/0042* (2013.01); *B60C 9/02* (2013.01); *B60C 9/08* (2013.01); *B60C 15/0018* (2013.01); *B60C 15/0027* (2013.01); *B60C 15/0036* (2013.01); *B60C 17/0009* (2013.01); *B60C 2001/0033* (2013.01); *B60C 2009/0035* (2013.01); *B60C 2009/0475* (2013.01); *B60C 2017/0054* (2013.01)

(58) Field of Classification Search
CPC ..................... C08L 9/00; C08K 3/04
See application file for complete search history.

(56) References Cited

U.S. PATENT DOCUMENTS

| | | | |
|---|---|---|---|
| 5,798,405 A | 8/1998 | Zimmer et al. | 524/496 |
| 6,022,434 A | 2/2000 | Willard, Jr. et al. | 156/130.7 |
| 6,220,326 B1 | 4/2001 | Blok et al. | 152/564 |
| 7,066,225 B2 | 6/2006 | Rhyne et al. | 152/158 |
| 7,337,815 B2 | 3/2008 | Spadone et al. | 152/209.1 |
| 7,789,119 B2 | 9/2010 | Agostini et al. | 152/516 |
| 8,071,671 B2 | 12/2011 | Hogan et al. | 524/495 |
| 8,124,682 B2 | 2/2012 | Froehlich et al. | 524/496 |
| 2002/0036043 A1 | 3/2002 | Thielen | 152/517 |
| 2002/0062894 A1 | 5/2002 | Miner et al. | 152/517 |
| 2008/0178981 A1 | 7/2008 | Agostini et al. | 152/517 |
| 2009/0101263 A1 | 4/2009 | Nakamura | 152/454 |
| 2009/0203828 A1* | 8/2009 | Kurazumi | B60C 1/0025 524/495 |
| 2009/0277554 A1 | 11/2009 | Donckels et al. | 152/517 |
| 2012/0234452 A1 | 9/2012 | Miyazaki | 152/541 |
| 2012/0296027 A1 | 11/2012 | Miyazaki | 524/496 |
| 2013/0160910 A1 | 6/2013 | Hennebert et al. | 152/450 |
| 2013/0237669 A1 | 9/2013 | Kloppenburg et al. | 525/233 |
| 2014/0102611 A1* | 4/2014 | Miyazaki | B60C 1/00 152/450 |
| 2014/0251521 A1 | 9/2014 | Domingo et al. | 152/527 |
| 2014/0283969 A1 | 9/2014 | Domingo et al. | 152/535 |

FOREIGN PATENT DOCUMENTS

| | | | |
|---|---|---|---|
| EP | 0 941 871 A2 | 9/1999 | |
| EP | 2 360 784 A | 10/2001 | |
| EP | 1 911 606 A1 | 4/2008 | |
| JP | 2009-270003 | 11/2009 | |
| JP | 2012-77215 A | 4/2012 | |
| KR | 10-2013-0019044 | 2/2013 | |
| WO | 2011/113899 A1 | 9/2011 | |
| WO | WO 2013031340 A1 * | 3/2013 | B60C 1/00 |
| WO | 2013/053877 A1 | 4/2013 | |
| WO | 2013/053879 A1 | 4/2013 | |

OTHER PUBLICATIONS

International Search Report dated Jun. 13, 2014, issued by EPO in connection with International Application No. PCT/EP2014/059694.
Brad Thompson Thermax N990 Medium Thermal Carbon Black in Nitrile Rubber Compounds, Cancarb, Apr. 28, 2010, pp. 1-8.

* cited by examiner

*Primary Examiner* — Wenwen Cai
(74) *Attorney, Agent, or Firm* — Fitzpatrick, Cella, Harper & Scinto

(57) ABSTRACT

The crosslinkable rubber composition comprises a first elastomer consisting of polybutadiene having a Mooney plasticity ranging from 40 to 70 Mooney units, the content of the first elastomer being strictly greater than 50 phr, a second elastomer, and a carbon black having a specific surface area within a range of values extending from 15 $m^2/g$ to 25 $m^2/g$ and an oil adsorption number of compressed sample (COAN) within a range of values extending from 65 ml/100 g to 85 ml/100 g.

15 Claims, 3 Drawing Sheets

RUBBER COMPOSITION WITH HIGH PROCESSABILITY FOR RUN-FLAT TIRE

FIELD OF THE INVENTION

The invention relates to a rubber composition and to a run-flat tyre.

RELATED ART

For several years, tyre manufacturers have sought to eliminate the need for the presence of a spare wheel on board the vehicle while at the same time guaranteeing that the vehicle will be able to continue its journey despite a significant or complete loss of pressure from one or more of the tyres. That for example allows a service centre to be reached without the need to stop, under circumstances that are often hazardous, in order to fit the spare wheel.

One envisaged solution is the use of run-flat tyres which are provided with self-supporting sidewalls (sometimes referred to by their English trade designations "ZP" for "zero pressure" or "SST" for "self supporting tyre").

A run-flat tyre comprising a crown comprising a crown reinforcement, which reinforcement is formed of two crown plies of reinforcing elements and surmounted by a tread, is known from the prior art. Two sidewalls extend the crown radially inwards. These sidewalls are reinforced by rubber inserts that are able to support a load at reduced pressure or even with no pressure. Each rubber insert is manufactured from a rubber composition based on a crosslinkable rubber composition. Each insert must have properties in the cured state, in particular sufficient stiffness, to at least partially support the load at reduced pressure, or even with no pressure.

The tyre further comprises two beads each one comprising a bead wire and a carcass reinforcement extending from the beads through the sidewalls to the crown and comprising two carcass plies of reinforcing elements. One of the carcass plies is anchored to each of the beads by a turn-up around the bead wire and the other carcass ply stops radially on the outside of the bead wire. The two carcass plies comprise textile reinforcing elements made of rayon.

When the inflation pressure is significantly reduced in comparison with the service pressure, or is even zero (this is then referred to as "run-flat" mode), the tyre must make it possible to cover a given distance at a given speed. This performance, referred to as "EM" (extended mobility) running performance, is required by legislation or by motor vehicle manufacturers in order to allow the producer to advertize the tyre as being a run-flat tyre.

When the inflation pressure is close to the service pressure (this is then referred to as "normal running" mode), it is desirable for the tyre to exhibit performance, referred to as "IM" (inflated mode) running performance, that is as good as possible. This IM running performance includes, amongst other things, the mass, the rolling resistance or even the comfort.

Each sidewall insert is manufactured from a strip of the extruded crosslinkable rubber composition. Thus, it is obviously desirable for the composition to be quick and easy to extrude, that is to say for it have the best processability possible. The processability of the crosslinkable rubber composition is linked to certain properties in the uncured state, in particular its plasticity, which is often incompatible with obtaining the EM running performance.

The objective of the invention is a crosslinkable rubber composition intended to form a sidewall insert of a run-flat tyre that provides the required EM running performance and that has a good processability.

In the present description, unless expressly indicated otherwise, all the percentages (%) given are % by weight. The acronym "phr" signifies parts by weight per hundred parts of elastomer.

Moreover, unless otherwise indicated, any range of values denoted by the expression "between a and b" represents the range of values extending from more than a to less than b (i.e. limits a and b excluded), whereas any range of values denoted by the expression "from a to b" means the range of values extending from "a" up to "b" (i.e. including the strict limits "a" and "b").

BRIEF DESCRIPTION OF EMBODIMENTS OF THE INVENTION

To that end, one subject of the invention is a crosslinkable rubber composition comprising:
 a first elastomer consisting of polybutadiene having a Mooney plasticity PMoo ranging from 40 to 70 Mooney units,
 a second elastomer,
 a carbon black having a specific surface area within a range of values extending from 15 $m^2/g$ to 25 $m^2/g$ and an oil adsorption number of compressed sample (COAN) within a range of values extending from 65 ml/100 g to 85 ml/100 g.

DETAILED DESCRIPTION OF THE INVENTION

The composition according to the invention has a high processability and makes it possible to obtain a sidewall insert of a run-flat tyre that has sufficient stiffness to provide the EM running performance. Indeed, the EM running performance and processability performance are obtained surprisingly owing to the combination of materials used for the manufacture of the rubber composition according to the invention. In accordance with the invention, this rubber composition comprises a mixture of elastomers comprising a predominant content of polybutadiene, this polybutadiene having a Mooney plasticity PMoo between 40 and 70 MU, and also a carbon black having a low specific surface area and a high structure.

A polybutadiene characterized by a high Mooney plasticity PMoo has, most of the time, a high molecular weight. The Mooney plasticity PMoo is measured using a consistometer according to the ASTM D-1646 standard.

Carbon black can be described as consisting of aggregates of fine particles in which the fine particles fuse together in order to form the aggregates. The characteristics of these aggregates may vary greatly between the various types of carbon black.

Carbon blacks are characterized by various properties, in particular by the specific surface area, which is characteristic of the size of the particles, and by the oil adsorption number of compressed sample (COAN for Compressed Oil Adsorption Number).

The specific surface area of the carbon black is determined according to the ASTM D-6556 standard by measuring the total outer surface area by adsorption of nitrogen. The structure of the carbon black is determined according to the ASTM D-3493 standard by measuring the oil adsorption number of compressed sample (COAN).

Preferably, the specific surface area of the carbon black is within a range of values extending from 17 $m^2/g$ to 22 $m^2/g$.

Preferably, the oil adsorption number of compressed sample (COAN) is within a range of values extending from 70 ml/100 g to 80 ml/100 g.

Preferably, the content of the first elastomer is strictly greater than 50 phr.

Advantageously, the first elastomer has a Mooney plasticity PMoo such that 40 Mooney units≤PMmoo≤65 Mooney units, preferably such that 40 Mooney units≤PMoo≤60 Mooney units and more preferably such that 40 Mooney units≤PMoo≤55 Mooney units. More preferably still, the first elastomer has a Mooney plasticity PMoo such that 40 Mooney units≤PMmoo<55 Mooney units and more preferably still such that 40 Mooney units≤PMoo≤50 Mooney units. Thus, the processability of the crosslinkable rubber composition is improved by reducing the Mooney plasticity of the first elastomer.

Advantageously, the content of the first elastomer is within a range of values extending from 50 to 80 phr, preferably from 55 to 75 phr and more preferably from 60 to 70 phr. Thus, the stiffness of the rubber composition and therefore the EM running performance are increased without actually penalizing the processability of the crosslinkable rubber composition.

Preferably, the rest of the rubber then consists of the second elastomer.

Preferably, the polybutadiene has a high content of cis-1,4-units. Thus, in one embodiment, the polybutadiene has a content of cis-1,4-units of at least 80% and preferably of at least 90% by weight of the total weight of the polybutadiene. In another embodiment, the polybutadiene has a content of cis-1,4-units within a range of values extending from 80% to 99%, preferably from 90% to 99% and more preferably from 92% to 99% by weight of the total weight of the polybutadiene.

In one embodiment, the second elastomer is of diene type.

An elastomer or rubber (the two terms being synonyms) of the "diene" type is understood to mean, generally, an elastomer resulting at least in part (i.e., a homopolymer or a copolymer) from diene monomers (monomers bearing two conjugated or unconjugated carbon-carbon double bonds).

Preferably, the second elastomer of diene type is selected from the group consisting of polybutadienes (BR), synthetic polyisoprenes (IR), natural rubber (NR), butadiene copolymers, isoprene copolymers and the mixtures of these elastomers.

Such copolymers are more preferably selected from the group consisting of styrene-butadiene copolymers (SBRs), isoprene-butadiene copolymers (BIRs), isoprene-styrene copolymers (SIRs), isoprene-butadiene-styrene copolymers (SBIRs) and the mixtures of such copolymers.

In the embodiments in which the composition comprises a second elastomer of diene type, this imparts, inter alia, green tack to the composition. The need to use a tackifying resin, which could increase the hysteresis of the composition and therefore reduce the ability of the sidewall insert to dissipate heat in run-flat mode, is limited or even eliminated. The EM running performance of the tyre is thus increased.

Advantageously, the crosslinkable rubber composition comprises a content of carbon black having a low specific surface area and a high structure within a range of values extending from 30 to 100 phr, preferably from 35 to 80 phr, more preferably from 40 to 75 phr and more preferably still from 40 to 60 phr.

Preferably, the carbon black having a low specific surface area and a high structure has an oil adsorption number (OAN) within a range of values extending from 100 ml/100 g to 150 ml/100 g, preferably from 110 ml/100 g to 150 ml/100 g, more preferably from 120 ml/100 g to 150 ml/100 g, more preferably still from 125 ml/100 g to 150 ml/100 g and very preferably from 130 ml/100 g to 150 ml/100 g.

The oil adsorption number (OAN) is also characteristic of the structure of the carbon black. The oil adsorption number (OAN) is measured using dibutyl phthalate in accordance with the ASTM D-2414 standard.

Preferably, the carbon black having a low specific surface area and a high structure has an iodine number within a range of values extending from 10 mg/g to 25 mg/g, preferably from 15 mg/g to 23 mg/g and more preferably from 18 mg/g to 21 mg/g.

The surface activity of a carbon black may also be measured by the difference between the specific surface area and the iodine number according to the ASTM D-1510 standard. The iodine number is a measurement of the adsorption of iodine by carbon black and is also used as a measurement of the specific surface area. Carbon blacks having a high activity have a tendency to have a positive number whereas carbon blacks having a lower activity have a tendency to have a negative number.

The rubber composition of the sidewall insert may also comprise all or some of the usual additives customarily used in elastomer compositions intended for the manufacture of tyres, such as, for example, plasticizers or extender oils, whether the latter are of aromatic or non-aromatic nature, pigments, protective agents, such as anti-ozone waxes, chemical anti-ozonants or antioxidants, anti-fatigue agents, reinforcing resins such as bismaleimides, methylene acceptors (for example, phenol-novolac resin) or methylene donors (for example, HMT or H3M).

Preferably, the composition comprises a crosslinking system, more preferably a vulcanization system. The crosslinking system, here vulcanization system, comprises a sulphur-donating agent, for example sulphur, and vulcanization activators.

The composition according to the invention is manufactured in appropriate mixers, using two successive phases of preparation well known to those skilled in the art: a first phase of thermomechanical working or kneading ("non-productive" phase) at high temperature, up to a maximum temperature of between 130° C. and 170° C., followed by a second phase of mechanical working ("productive" phase) at lower temperature, typically of less than 110° C., during which the crosslinking or vulcanization system is incorporated.

By way of example, the first (non-productive) phase is carried out in a single thermomechanical stage during which the various components, with the exception of the vulcanization system, are introduced into an internal mixer. The total duration of the kneading, in this non-productive phase, is preferably between 2 and 10 minutes.

After cooling the mixture thus obtained, the vulcanization system is then incorporated at low temperature, generally in an external mixer such as an open mill. Everything is then mixed (productive phase) for a few minutes, for example between 1 and 30 minutes.

The composition thus obtained is then calendered, for example in the form of a sheet or a slab, or else extruded, for example in order to form a rubber profiled element used for the manufacture of semi-finished products such as sidewall inserts used for the manufacture of a tyre according to the invention as described below.

The vulcanization (or curing) is carried out in a known manner at a temperature generally between 130° C. and 200° C., preferably under pressure, for a sufficient time which may vary, for example, between 5 and 90 min.

Another subject of the invention is a run-flat tyre comprising a sidewall insert manufactured from a rubber composition based on a crosslinkable rubber composition as defined above.

In addition to obtaining the required EM running performance, the tyre according to the invention has an IM running performance relatively close to that of a standard tyre that does not have self-supporting sidewalls.

Indeed, the self-supporting sidewalls of the tyre of the prior art give rise to significant losses in IM running performance, notably by comparison with a standard tyre that does not have self-supporting sidewalls. In particular, the mass of these inserts leads to an increase in the total mass of the tyre of the prior art. Further, the addition of these inserts inevitably leads to an increase in the hysteresis and therefore to an increase in the rolling resistance. In addition, these inserts increase the stiffness of the sidewalls of the tyre of the prior art, which reduces the comfort of the tyre.

On the contrary, the tyre according to the invention has relatively low stiffness and hysteresis. This combination makes it possible to obtain a run-flat tyre that has better IM running performance than that of the tyre of the prior art, in particular an improved rolling resistance, a lower mass and a better comfort while preserving the required EM running performance.

The expression "based on" should of course be understood to mean that the rubber composition is made from a cured or vulcanized rubber composition which was, during its manufacture, in an uncured state. The cured or vulcanized rubber composition is therefore "based on" the uncured rubber composition. In other words, the crosslinked rubber composition is based on or comprises the constituents of the crosslinkable rubber composition.

Preferably, the tyres may be intended for motor vehicles of passenger, 4×4 or "SUV" (Sport Utility Vehicle) type.

Advantageously, the tyre comprises a carcass reinforcement comprising at least one carcass ply.

Preferably, the carcass reinforcement comprises a single carcass ply.

By using only one carcass ply, the cost, the mass and also the hysteresis, and therefore the rolling resistance, of the tyre are further reduced. The presence of a single carcass ply makes it possible to obtain a tyre with a carcass reinforcement that is more flexible than a tyre with a carcass reinforcement that comprises two carcass plies. Thus, the vertical stiffness of the tyre is reduced and the comfort thereof is improved, thus bringing it closer to the level of comfort of a standard tyre that does not have self-supporting sidewalls.

Preferably, the carcass ply comprises at least one textile reinforcing element. The term "textile" is understood to mean a material selected from a polyester, polyamide, for example an aliphatic polyamide such as nylon or an aromatic polyamide such as aramid, a polyketone, a cellulose such as rayon or a mixture of these materials.

Advantageously, the carcass ply comprises at least one polyester reinforcing element.

The rubber composition preferably has a heating resistance which is greater than that of the compositions of the sidewall inserts of the tyre of the prior art. Thus, in run-flat mode, that is to say when the temperature of the sidewall inserts rises (due to the heating linked to the loss of pressure), the temperature of the sidewall insert of the tyre rises less rapidly and less high relative to the temperature of a sidewall insert of the tyre of the prior art. It is therefore possible to use polyester reinforcing elements that have a thermal stability which is lower than that of rayon, but is sufficient considering the high heating resistance of the sidewall inserts of the tyre.

Furthermore, unlike rayon, polyester is relatively good value and requires no or few precautions with respect to the environment.

Preferably, the carcass ply comprises several reinforcing elements made of polyester, and more preferably all its reinforcing elements are made of polyester.

Optionally, the tyre comprises two beads each one comprising at least one annular reinforcing structure, the carcass reinforcement being anchored in each of the beads by a turn-up around the annular reinforcing structure.

Optionally, the polyester reinforcing element comprises at least two polyester multifilament strands twisted together.

The reinforcing element is also referred to as plied yarn. Each multifilament strand is also referred to as overtwist and comprises a plurality of elementary filaments or monofilaments which may potentially be interlaced with one another. Each strand comprises between 50 and 2000 monofilaments.

Optionally, the constituent elementary filaments of each polyester multifilament strand are twisted with a twist factor within a range of values extending from 90 to 170, preferably from 120 to 150.

It will be recalled here that, in a reinforcing element, the twist factor of a multifilament strand (more precisely of the constituent elementary filaments of said strand) is expressed according to the following relationship:

$$K = (\text{twist in turns/meter}) \times [(\text{count of the strand (in tex)}/(1000 \cdot \rho)]^{1/2}$$

in which the twist is expressed in turns per meter of strand, the count of the strand is expressed in tex (weight in grams of 1000 meters of strand), and finally $\rho$ is the density or mass per unit volume (in g/cm$^3$) of the constituent material of the strand (1.25 to 1.40 for polyesters and 1.38 for PET).

In one embodiment, preferably used when the tyre comprises a single carcass ply, the count of each polyester multifilament strand is within a range of values extending from 100 to 500 tex, preferably from 300 to 370 tex and the twist of each polyester multifilament strand before plying the strands together is within a range of values extending from 200 to 500 turns per meter, preferably from 200 to 340 turns per meter, and more preferably from 240 to 300 turns per meter.

In one embodiment, preferably used when the tyre comprises two carcass plies, the count of each polyester multifilament strand is within a range of values extending from 100 to 500 tex, preferably from 110 to 170 tex and the twist of each polyester multifilament strand before plying the strands together is within a range of values extending from 200 to 500 turns per meter, preferably from 300 to 500 turns per meter, and more preferably from 380 to 470 turns per meter.

The use of a relatively low count makes it possible to reduce the diameter of the reinforcing element owing to a better toughness of the polyester relative to that of rayon which has an equivalent breaking force but for a higher count and therefore a relatively large diameter. Thus, a smaller amount of rubber is required to calender the reinforcing elements made of polyester compared to reinforcing elements made of rayon. The reduction in the mass of rubber makes it possible to reduce the cost, the mass and also the hysteresis, and therefore the rolling resistance, of the tyre.

Indeed, preferably, the diameter of the reinforcing element is less than or equal to 1.1 mm, or even 1 mm and more preferably 0.7 mm. The diameter of the reinforcing element is that of the circle inside which the reinforcing element is inscribed. When the count is relatively low, the twist of each strand is high enough so that the reinforcing element is sufficiently tough. The twist is also sufficiently limited to obtain a high modulus and therefore improve the EM running performance of the tyre.

The values described above are measured on reinforcing elements that are directly manufactured or else that are extracted from reinforcing plies. As a variant, the values described above are measured on reinforcing elements extracted from a tyre.

Preferably, each strand is helically wound around the other.

Advantageously, the polyester is selected from polyethylene terephthalate (PET), polyethylene naphthalate (PEN), polybutylene terephthalate (PBT), polybutylene naphthalate (PBN), polypropylene terephthalate (PPT) or polypropylene naphthalate (PPN), and the polyester is preferably polyethylene terephthalate (PET).

The invention will be better understood on reading the following description, given solely by way of non-limiting example and with reference to the drawings in which.

When using the term "radial", a distinction should be made between several different uses of the word by the person skilled in the art. Firstly, the expression refers to a radius of the tyre. It is in that sense that a point A is said to be "radially inside" a point B (or "radially on the inside of" the point B) if it is closer to the axis of rotation of the tyre than is the point B. Conversely, a point C is said to be "radially outside" a point D (or "radially on the outside of" the point D) if it is further from the axis of rotation of the tyre than is the point D. Progress "radially inwards (or outwards)" will mean progress towards smaller (or larger) radii. In terms of radial distances, it is this sense of the word that applies also.

On the other hand, a reinforcing element or a reinforcement is said to be "radial" when the reinforcing element or the reinforcing elements of the reinforcement make an angle greater than or equal to 65° and less than or equal to 90° with the circumferential direction.

Finally, a "radial cross section" or "radial section" here means a cross section or a section in a plane which contains the axis of rotation of the tyre.

An "axial" direction is a direction parallel to the axis of rotation of the tyre. A point E is said to be "axially inside" a point F (or "axially on the inside of" the point F) if it is closer to the median plane of the tyre than is the point F. Conversely, a point G is said to be "axially outside" a point H (or "axially on the outside of" the point H) if it is further from the median plane of the tyre than is the point H.

The "median plane" of the tyre is the plane which is perpendicular to the axis of rotation of the tyre and which lies equal distances from the annular reinforcing structures of each bead.

A "circumferential" direction is a direction which is perpendicular both to a radius of the tyre and to the axial direction.

EXAMPLES OF A TYRE ACCORDING TO THE INVENTION

Figure 1:
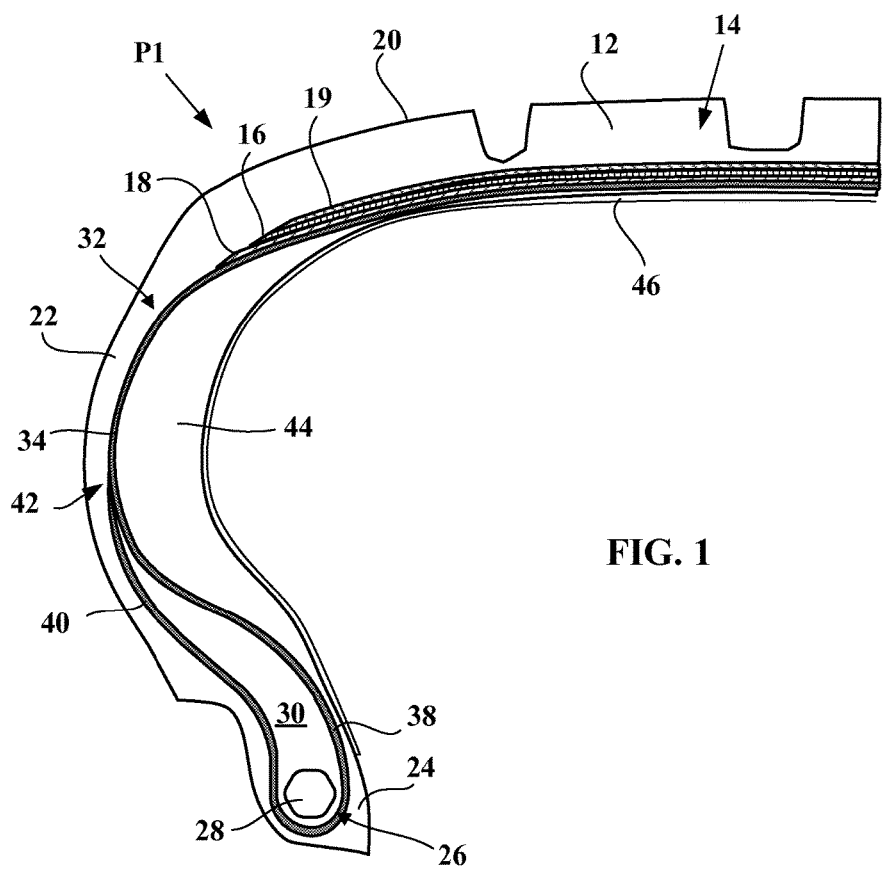
FIG. 1 is a radial cross-sectional view of a run-flat tyre according to a first embodiment of the invention.

FIG. 1 schematically depicts, in radial cross-sectional view, a tyre according to a first embodiment of the invention denoted by the general reference P1. The tyre P1 is of the run-flat type. The tyre P1 is intended for a passenger vehicle.

This tyre P1 comprises a crown 12 comprising a crown reinforcement 14, formed of two crown plies of reinforcing elements 16, 18 and of a hooping ply 19. The crown reinforcement 14 is surmounted by a tread 20. Here, the hooping ply 19 is positioned radially outside the plies 16, 18, between the plies 16, 18 and the tread 20. Two self-supporting sidewalls 22 extend the crown radially inwards.

The tyre P1 additionally comprises two beads 24 radially inside the sidewalls 22 and each comprising an annular reinforcing structure 26, in this instance a bead wire 28, surmounted by a mass of filling rubber 30 on the bead wire, and a radial carcass reinforcement 32.

The carcass reinforcement 32 preferably comprises a single carcass ply 34 of reinforcing elements 36, the ply 34 being anchored to each of the beads 24 by a turn-up around the bead wire 28, so as to form, within each bead 24, a main strand 38 extending from the beads through the sidewalls towards the crown, and a turn-up strand 40, the radially outer end 42 of the turn-up strand 40 being substantially midway up the height of the tyre. The carcass reinforcement 32 extends from the beads 24 through the sidewalls 22 towards the crown 12.

The rubber compositions used for the crown plies 16, 18 and carcass ply 34 are conventional compositions for the calendering of reinforcing elements, typically based on natural rubber, carbon black, a vulcanization system and the usual additives. When the reinforcing elements are textile reinforcing elements, in particular here in the carcass reinforcement, adhesion between the textile reinforcing element and the rubber composition that coats it is ensured for example by a standard adhesive of RFL type.

The tyre P1 also comprises two sidewall inserts 44, axially inside the carcass reinforcement 32. These inserts 44 with their characteristic crescent-shaped radial cross section are intended to reinforce the sidewall. Each insert 44 is manufactured from a rubber composition based on a cross-linkable rubber composition M1 described hereinbelow. Each sidewall insert 44 is capable of helping to support a load corresponding to a portion of the weight of the vehicle during a run-flat situation.

Amongst other characteristics, the composition M1 comprises a first elastomer consisting of polybutadiene having a Mooney plasticity $PM_{oo}$ ranging from 40 to 70 Mooney units. In this instance, the first elastomer has a Mooney plasticity $PM_{oo}$ ranging from 40 to 65 Mooney units. Furthermore, the content of the first elastomer of M1 is within a range of values extending from 50 to 80 phr, preferably from 55 to 75 phr and more preferably from 60 to 70 phr.

Moreover, in the composition M1, the content of the first elastomer is strictly greater than 50 phr.

The composition M1 comprises a second elastomer forming, with the first elastomer, all of the rubber of the composition.

The composition M1 comprises a carbon black having a specific surface area within a range of values extending from 15 $m^2/g$ to 25 $m^2/g$ and an oil adsorption number of compressed sample (COAN) within a range of values extending from 65 ml/100 g to 85 ml/100 g.

The tyre also comprises an airtight inner layer 46, preferably made of butyl rubber, located axially inside the sidewalls 22 and radially inside the crown reinforcement 14 and extending between the two beads 24. The sidewall inserts 44 are located axially outside the inner layer 46.

Thus, the sidewall inserts 44 are positioned axially between the carcass reinforcement 32 and the inner layer 46.

Figure 2:
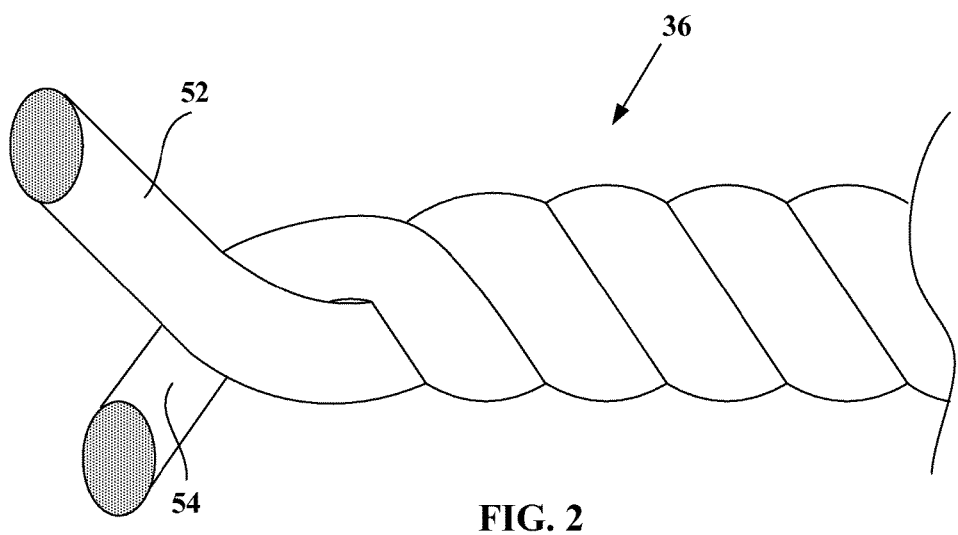
FIG. 2 illustrates a detail view of a reinforcing element of the tyre from FIG. 1.

The carcass ply 34 comprises textile reinforcing elements 36, one of which is illustrated in FIG. 2. The reinforcing elements 36 are parallel to one another. Each reinforcing element 36 is radial. In other words, each reinforcing element 36 extends in a plane substantially parallel to the axial direction of the tyre P1.

With reference to FIG. 2, each reinforcing element 36 comprises two multifilament strands 52, 54 made of polyester which are individually overtwisted at 270 turns/meter then plied together at 270 turns/meter. The two strands 52, 54 are helically wound around one another.

The polyester is selected from polyethylene terephthalate, polyethylene naphthalate, polybutylene terephthalate, polybutylene naphthalate, polypropylene terephthalate or polypropylene naphthalate. In this instance, the polyester is polyethylene terephthalate (PET).

The count of each polyester multifilament strand 52, 54 is within a range of values extending from 100 to 500 tex, preferably from 300 to 370 tex. Here, the counts of the polyester multifilament strands 52, 54 are equal and have a value of 334 tex.

The twist of each polyester multifilament strand 52, 54 before plying the multifilament strands together is within a range of values extending from 200 to 500 turns per meter, preferably from 200 to 340 turns per meter, and more preferably from 240 to 300 turns per meter. Here, the producer twists of the polyester multifilament strands 52, 54 before plying the multifilament strands together are equal and have a value of 270 turns per meter.

The constituent elementary filaments of each polyester multifilament strand 52, 54 are plied with a twist factor of between 90 and 170 limits included, preferably between 120 and 150 limits included. Since the PET has a density equal to 1.38, the twist factor of each strand is here equal to 133.

The reinforcing element has, for example, identical strands having the same twist. This is then a twist-balanced strand.

For the manufacture of the reinforcing elements 36 by plying, it will be recalled here simply, in a manner well known to person skilled in the art, that each constituent strand of the final reinforcing element is firstly individually twisted on itself in a given direction (for example Z twisting of Y turns per meter of strand) during a first step in order to form an overtwist yarn, then that the strands thus twisted on themselves are subsequently plied together in the opposite direction (for example S twisting of X turns per meter of reinforcing element) in order to form a plied yarn, here the final reinforcing element 36.

The twist before plying of each multifilament strand may be measured on the final reinforcing element by untwisting the constituent multifilament strands of the reinforcing element (for example by Z untwisting of X turns per meter of reinforcing element) until the reinforcing element no longer has any twist, then by untwisting each multifilament strand (for example by S untwisting of Y turns per meter) until each strand no longer has any twist. The number of turns per meter X, Y necessary for these two untwisting operations then respectively gives the producer twist of the reinforcing element (here X=270) and the twist of each multifilament strand before plying the strands together (here Y=270).

Figure 3:
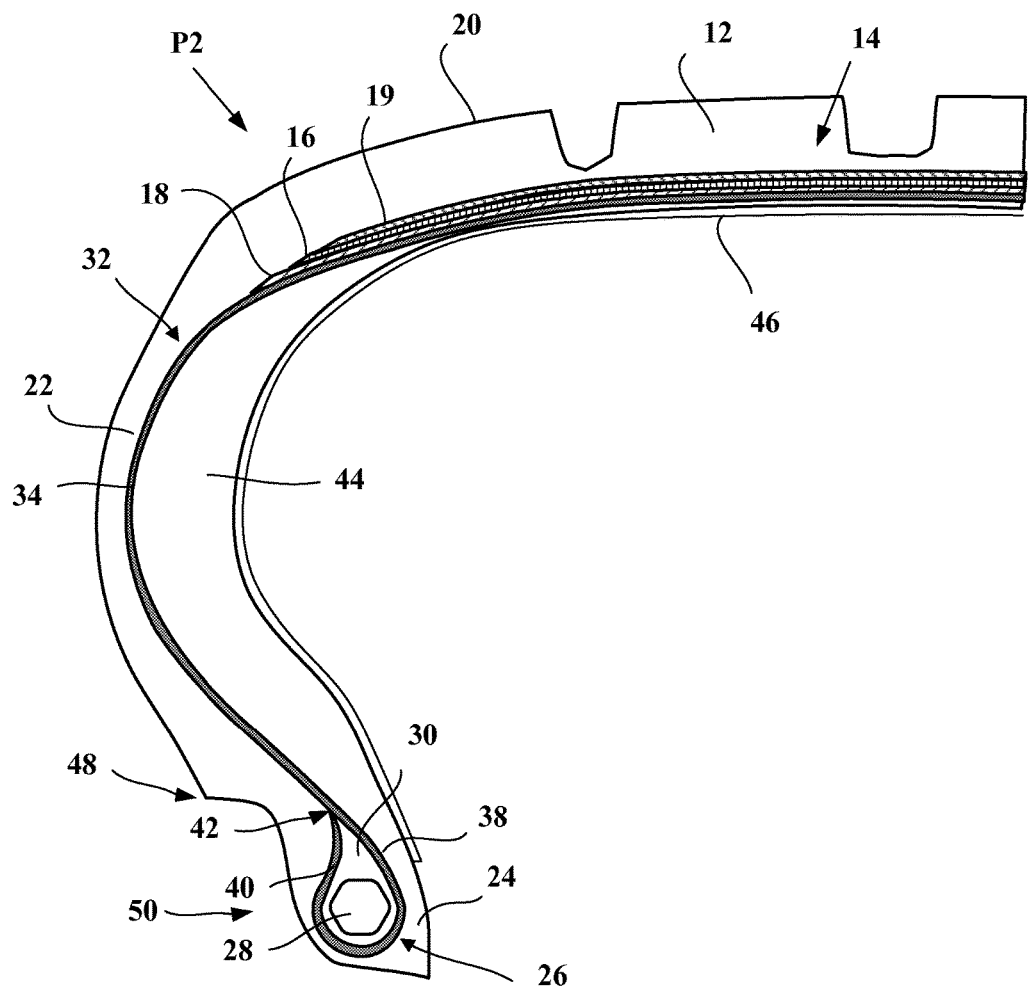
FIGS. 3 and 4 are views similar to that of FIG. 1 of tyres respectively according to second and third embodiments.

FIG. 3 depicts a tyre P2 according to a second embodiment of the invention. Elements similar to those of the first embodiment are denoted by identical references.

Unlike the tyre P1 of the first embodiment, the tyre P2 according to the second embodiment is of the type having a shortened turn-up strand. The radially outer end 42 of the turn-up strand 40 is radially on the inside of the radially outermost end 48 of the bead 24 of the portion 50 of the bead 24 intended to bear against the rim flange.

Figure 4:
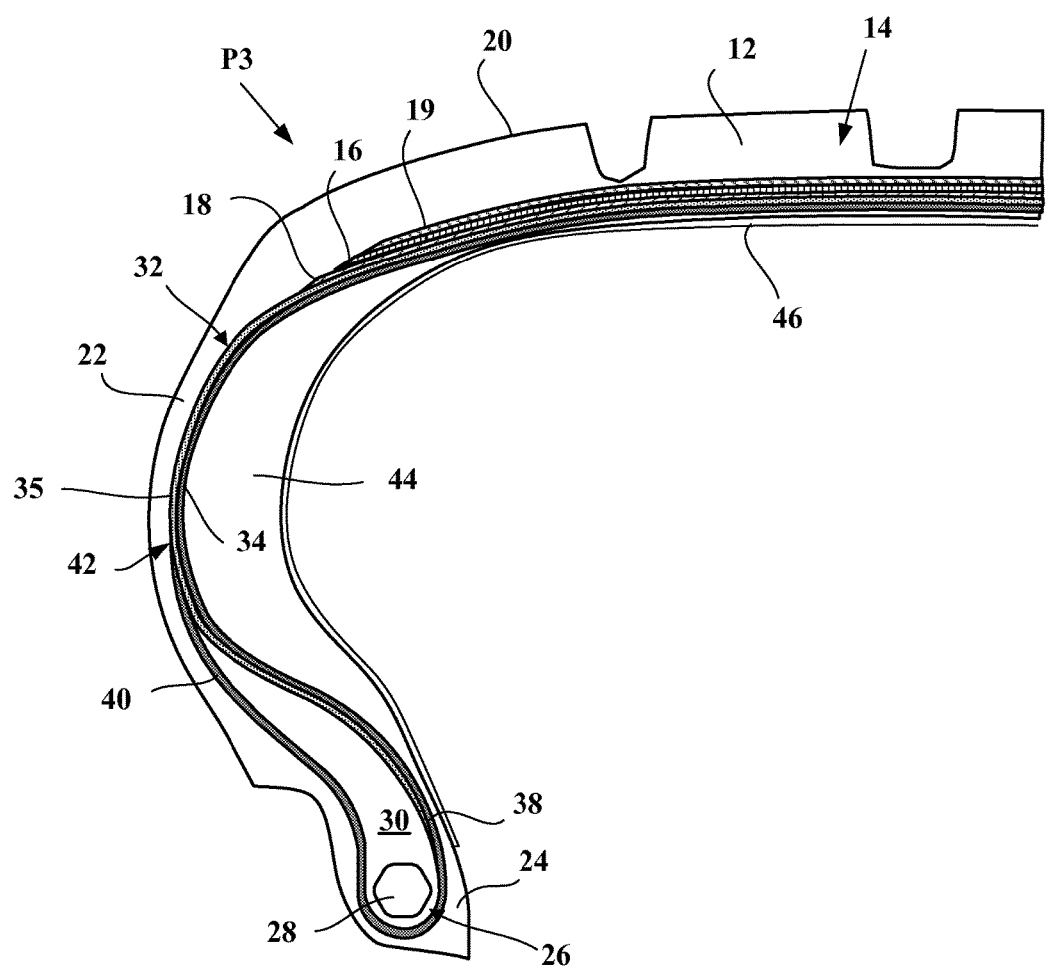

FIG. 4 depicts a tyre P3 according to a third embodiment of the invention. Elements similar to those of the first embodiment are denoted by identical references.

Unlike the tyre P1 according to the first embodiment, the carcass reinforcement 32 of the tyre comprises two carcass plies 34, 35. The carcass reinforcement 32 comprises a first carcass ply 34 anchored in each of the beads in a manner identical to that of the tyre P1 and a second carcass ply 35, placed next to the first carcass ply and stopping radially on the outside of the bead wire 28. The second carcass ply 35 is inserted between the main strand 38 and turn-up strand 40.

In this third embodiment, the count of each polyester multifilament strand is within a range of values extending from 100 to 500 tex, preferably from 110 to 170 tex. Here, the counts of the polyester multifilament strands 52, 54 are equal and have a value of 144 tex.

The twist of each polyester multifilament strand before plying the strands together is within a range of values extending from 200 to 500 turns per meter, preferably from 300 to 500 turns per meter, and more preferably from 380 to 470 turns per meter. Here, the producer twists of the polyester multifilament strands 52, 54 before plying the strands together are equal and have a value of 420 turns per meter.

The twist factor K of each polyester strand is here equal to 136.

A tye P4 according to a fourth embodiment of the invention was also manufactured.

Unlike the tyre P1 according to the first embodiment, each insert 44 of the tyre P4 according to the fourth embodiment is manufactured from a rubber composition based on a crosslinkable rubber composition M2 described hereinbelow. Unlike the composition M1, the first elastomer has a Mooney plasticity PMoo such that 40 Mooney units≤PMmoo≤65 Mooney units, preferably such that 40 Mooney units≤PMoo≤60 Mooney units and more preferably such that 40 Mooney units≤PMoo≤55 Mooney units. More preferably still, the first elastomer has a Mooney plasticity PMoo such that 40 Mooney units≤PMmoo<55 Mooney units and more preferably still such that 40 Mooney units≤PMoo≤50 Mooney units.

Examples of Compositions of the Sidewall Insert of the Tyre According to the Invention and Comparative Tests Various crosslinkable rubber compositions and the physical properties thereof are compared in Table 1. The amounts of the various components are given in parts by weight per hundred parts of elastomer (phr).

The Mooney plasticity is measured according to the following principle and in accordance with the ASTM D-1646 standard. The generally uncured polybutadiene is moulded in a cylindrical chamber heated at a given temperature, usually 100° C. After preheating for one minute, an L-type rotor rotates within the test specimen at 2 revolutions/minute and the working torque for maintaining this movement is measured after rotating for 4 minutes. The Mooney plasticity (ML 1+4) is expressed in "Mooney units" (MU, with 1 MU=0.83 newton·meter).

The nominal secant moduli (or apparent stresses, in MPa) are measured in second elongation (i.e. after an accommodation cycle at the extension rate provided for the measurement itself) at 10% elongation (denoted by MA10) and at 100% elongation (denoted by MA100) at 23° C.±2° C., and under normal hygrometry conditions (50%±5% relative humidity) in accordance with the ASTM D-412 standard.

The hysteresis losses, denoted by P60, are measured as percentage rebound at the sixth rebound at 60° C. in accordance with the following equation: HL (%)=100·{(W0−W1)/W1} in which W0 is the energy supplied and W1 is the energy returned.

The flow measurements are carried out using a DOLI Ultimate flexometer manufactured by DOLI Industrie Electronik GMBH in accordance with the ASTM D-623 standard (Heat Generation and Flexing Fatigue in Compression) on test specimens having a length of 25 mm and a diameter of 17.8 mm. Each test lasts 3 hours, at the end of which period the percentage flow (variation in the height of the test specimen between the start and the end of the test, expressed in % of the initial height) of the test specimen subjected to repeated cyclic flexing, is recorded. If the test specimen breaks before the end of these 3 hours, the percentage flow is not measured. The test is carried out in a chamber at 90° C. with a pre-stress of 2 MPa and by giving rise to an elongation of 25% (6.25 mm) at a frequency of 30 Hz.

The extrusion speed of the crosslinkable rubber composition is also measured by continuously manufacturing on an extruder a strip of the rubber composition to be tested of predetermined width. The length of strip manufactured over a predetermined time interval is measured. The extrusion speed of the strip in m·min$^{-1}$ is deduced therefrom.

In the table below, the caption "NM" means that the characteristic was not measured for the composition in question.

TABLE 1

| Formulations | C1 | C2 | C3 | C4 | F2 | M1 | M2 |
|---|---|---|---|---|---|---|---|
| Natural rubber | 50 | 35 | 50 | 35 | 35 | 35 | 35 |
| Tin-functionalized polybutadiene, 50 MU | 50 | | | | | | |
| Polybutadiene, Mooney 44 MU | | | 50 | 65 | | | 65 |
| Polybutadiene, Mooney 63 MU | | | | | | 65 | |
| Polybutadiene, Mooney 75 MU | | 65 | | | 65 | | |
| Carbon black N650 | 50 | 50 | | 50 | | | |
| Carbon black S204 | | | 50 | | 50 | 50 | 50 |
| Oil | | 2 | | | | | |
| Additives | 9 | 9 | 9 | 8 | 9 | 9 | 9 |
| Vulcanization system | 6.2 | 6.2 | 6.2 | 5.5 | 6.2 | 6.2 | 6.2 |
| Physical properties | | | | | | | |
| MA10 at 23° C. (MPa) | 6.6 | 6.4 | 6.4 | 6.5 | 6.2 | 6.8 | 6.8 |
| MA100 at 23° C. (MPa) | 4.9 | 4.3 | 4.6 | 4.7 | 4.3 | 4.3 | 4.4 |
| P60 (%) | 5.9 | 6.4 | 5.6 | 6.5 | 5.5 | 6.8 | 6.8 |
| Flow (%) | 4.5 | 14 | 6.9 | 23 | 2.9 | NM | NM |
| Processability properties | | | | | | | |
| Extrusion speed (m · min$^{-1}$) | NM | NM | NM | NM | 1.5 | 2 | 6.5 |

The compositions C1 to C4 and F2 are control crosslinkable rubber compositions. The compositions M1, M2 are crosslinkable rubber compositions according to the invention.

Each composition C1 to C4, F2 and M1, M2 comprises two elastomers, here two elastomers of diene type, here a polybutadiene and natural rubber.

Each composition C1 to C4, F2 and M1, M2 comprises additives comprising N-1,3-dimethylbutyl-N-phenyl-para-phenylenediamine ("Santoflex 6-PPD" from FLEXSYS), 2,2,4-trimethyl-1,2-dihydroquinoline polymer (TMQ), zinc oxide and stearic acid.

Each composition C1 to C4, F2 and M1, M2 comprises a conventional vulcanization system comprising accelerators and insoluble sulphur. The composition C2 comprises a paraffinic oil.

The tin-functionalized polybutadiene (Nipol BR 1250H) used in the composition C1 has a Mooney plasticity equal to 50 MU and a content of cis-1,4-units equal to 35%. The polybutadiene (Buna CB21, LANXESS) used in the compositions C2 and F2 has a Mooney plasticity equal to 75 MU and a content of cis-1,4-units equal to 96%. The polybutadiene (Buna CB24, LANXESS) used in the compositions C3, C4 and M2 has a Mooney plasticity equal to 44 MU and a content of cis-1,4-units equal to 96%. The polybutadiene (Buna CB22, LANXESS) used in the composition M1 has a Mooney plasticity equal to 63 MU and a content of cis-1,4-units equal to 96%.

The carbon black having a low specific surface area and a high structure S204 is sold by Orion Engineered Carbons. The carbon black S204 has a specific surface area equal to 19 m$^2$/g, an oil adsorption number (OAN) equal to 138 ml/100 g, an oil adsorption number of compressed sample (COAN) equal to 76 ml/100 g and an iodine number equal to 19.6 mg/g.

The various compositions C1 to C4, F2 and M1, M2 were manufactured in a Banbury mixer by mixing, in a first step, the components from Table 1, with the exception of the vulcanization system, until the components are dispersed and until a temperature between 130° C. and 170° C. is achieved. Then, in a second step, the vulcanization system is added in a mixer. The composition is cured at 150° C. for 25 minutes.

The composition C1 comprises a functionalized polybutadiene and a conventional N650 carbon black for a sidewall insert of a run-flat tyre of the prior art.

In the composition C2, the functionalized polybutadiene from C1 was replaced by an unfunctionalised polybutadiene having a high Mooney plasticity. However, the composition C2 has insufficient stiffness (MA10 at 23° C.) and too high a flow.

The composition C3 comprising a polybutadiene having a low Mooney plasticity with a content less than or equal to 50 phr, here 50 phr and a carbon black having a low specific surface area and a high structure, has insufficient stiffness (MA10 at 23° C.).

The properties of the composition C4 comprising a conventional N650 carbon black are even worse than those of C3, in particular the flow which is too high.

The composition F2, comprising a carbon black having a low specific surface area and a high structure and also a polybutadiene having a Mooney plasticity of greater than 70 MU, has satisfactory physical properties but a limited extrusion speed.

The rubber compositions M1, M2 have a modulus of elongation MA10 at 23° C. of between 5.5 MPa and 7 MPa, preferably between 6 MPa and 7 MPa and more preferably between 6.5 MPa and 7 MPa.

Furthermore, each composition M1 and M2 has a hysteresis loss P60 of less than 8%, preferably less than 7%.

Each composition M1, M2 has stiffness properties, in particular the MA10 at 23° C., that enable the sidewall insert to provide the EM running performance. In addition, each composition M1, M2 has a processing property, here the extrusion speed, superior to that of the other control compositions, in particular F2.

Thus, the compositions M1 and M2 comprising a predominant content of polybutadiene having a relatively low Mooney plasticity PMoo and a carbon black having a low specific surface area and a high structure in accordance with the invention have physical properties that are compatible with use in a sidewall insert of a run-flat tyre and a high processability.

Characteristics of the reinforcing element 36 of tyres P1 to P4 in accordance with the embodiments of the invention described above and of reinforcing elements of other tyres of the prior art are compared in Table 2.

Among other characteristics, each tyre P1 to P4 comprises a carcass reinforcement comprising polyester reinforcing elements and two sidewall inserts manufactured from a rubber composition based on one of the crosslinkable rubber compositions M1, M2 described above.

The tyre I is of standard type not provided with self-supporting sidewalls and comprises a carcass reinforcement comprising a single carcass ply. The carcass ply comprises textile reinforcing elements made of polyester.

The tyre II is a run-flat tyre and comprises a carcass reinforcement comprising two carcass plies. Each carcass ply comprises textile reinforcing elements. Each reinforcing element comprises two multifilament strands made of rayon that are plied together. The tyre II comprises sidewall inserts manufactured from a rubber composition based on the control crosslinkable rubber composition C1 described above.

All the properties indicated are measured on sized textile reinforcing elements (i.e. ones that are ready to use, or else that have been extracted from the tyre that they reinforce) that have been subjected to a pre-conditioning; the term "conditioning" is understood to mean the storage of the cords (after drying) for at least 24 hours, before measurement, in a standard atmosphere according to the DIN EN 20139 European standard (temperature of 20±2° C.; hygrometry of 65%±2%).

The count (or linear density) of the elementary strands or of the reinforcing elements is determined on at least two samples, each corresponding to a length of at least 5 m, by weighing this length; the count is given in tex (weight in grams of 1000 m of product—remember: 0.111 tex is equal to 1 denier).

TABLE 2

| Tyre | I | II | P1/P2/P4 | P3 |
|---|---|---|---|---|
| Composition of the sidewall inserts | NA | C4 | M1/M1/M2 | M1 |
| Nature of the strands | PET/PET | Rayon/Rayon | PET/PET | PET/PET |
| Count of the strands (tex) | 334/334 | 184/184 | 334/334 | 144/144 |
| Twists of the strands (turns/m) | 270/270 | 480/480 | 270/270 | 420/420 |
| Diameter (mm) | 0.96 | 0.68 | 0.96 | 0.62 |
| Twist factor of each strand | 133 | 170 | 133 | 136 |
| Breaking force (daN) of the reinforcing element | 40 | 17 | 40 | 17 |
| Glass transition temperature (° C.) | 110 | NA | 110 | 110 |
| Melting point (° C.) | 260 | NA | 260 | 260 |
| Degradation temperature (° C.) | ~350 | ~350 | ~350 | ~350 |

The caption NA (not applicable) means that the value does not exist or has no significance.

The PET is sold by Performance Fibers under the name 1×50. The rayon is sold by Cordenka under the name Super 3-T700.

The IM running performance of the tyres I, II, P3 and P4 and the EM running performance of the tyres I, II, P1 to P4 are compared in Table 3.

Mass of the Tyre

The value of the mass is indicated in relative units (base 100) in relation to the mass of the tyre I of the prior art. The higher the mass in comparison with that of the tyre I of the prior art, the greater the extent to which the value is lower than 100.

Rolling Resistance

The rolling resistance is measured, after a thermal stabilization step, from measuring the deceleration of a wheel provided with the tested tyre pressed against a test flywheel. The load applied is equal to 85% of the ETRTO (European Tyre and Rim Technical Organisation) load.

The rolling resistance value is indicated in relative units (base 100) in relation to the rolling resistance of the tyre I of the prior art. The higher the rolling resistance in comparison with that of the tyre I of the prior art, the greater the extent to which the value is lower than 100.

Comfort

Comfort is determined from a vertical firmness measurement. The vertical firmness measurement is carried out on a wheel comprising a dynamometric hub on which the tested tyre is mounted. The wheel is pressed against a test flywheel under a load equal to 80% of the ETRTO load. The flywheel comprises a bar acting as an obstacle. The vertical firmness of the tyre is determined from the force measured by the dynamometric hub. The higher the force, the greater the vertical firmness and the lower the perception of comfort.

The vertical firmness value is indicated in relative units (base 100) in relation to the vertical firmness of the tyre I of the prior art. The lower the vertical firmness in comparison with that of the tyre I of the prior art and therefore the better the comfort, the closer the value is to 100.

Run-Flat Test

The run-flat test is carried out in accordance with UNECE regulation 30. A value of 0 indicates that the tested tyre failed the run-flat test. A value of 1 indicates that the tested tyre successfully passed the run-flat test

TABLE 3

| Tyre | I | II | P1 | P2 | P3 | P4 |
|---|---|---|---|---|---|---|
| Mass of the tyre | 100 | 79 | NM | NM | 80 | 82 |
| Rolling resistance | 100 | 94 | NM | NM | 96 | 97 |
| Vertical firmness | 100 | 92 | NM | NM | 90 | 92 |
| Run-flat test | 0 | 1 | 1 | 1 | 1 | 1 |

In the table above, the caption "NM" means that the characteristic was not measured for the tyre in question.

The results of Table 3 indicate that the tyres according to the invention provide the required EM running performance (value of 1 for the run-flat test). It will furthermore be noted that, advantageously, the tyres P1 to P4 satisfy the EM running performance while avoiding the use of rayon within the carcass plies owing to a combination of the composition according to the invention and of polyester reinforcing elements. The tyres P3 and P4, but also by transitivity of the results, the tyres P1 and P2, have, among the run-flat tyres (tyres II, P1 to P4), the IM running performance closest to the standard tyre I. Although their IM running performance is inferior to that of the standard tyre I, each tyre according to the invention has IM running performance superior or equal to that of run-flat tyre II while avoiding the use of rayon within the carcass plies. Moreover, the carcass ply of each tyre according to the invention has a breaking force at least equal to that of tyres I and II.

The invention is not limited to the embodiments described above.

The reinforcing elements could be made from a textile material other than polyester. For example, the textile material could also be selected from a polyamide, a polyketone, a cellulose or a mixture of these materials.

An embodiment could be conceived of in which the turn-up strand 40 extends up between the crown reinforcement 14, here the crown ply 18, and the main strand 38. In this case, the tyre is generally referred to as a tyre of "shoulder lock" architecture in order to indicate that the turn-up strand 40 is locked at the shoulder between the main strand 38 and the crown reinforcement 18. Such an architecture makes it possible to reinforce the tyre at the shoulder of the latter.

An embodiment could also be conceived of in which the carcass reinforcement comprises an auxiliary reinforcing element extending between the bead 24 and the crown 12 of the tyre. This auxiliary reinforcing element is inserted between the main strand 38 and the turn-up strand 40 and extends up between the crown ply 18 and the main strand 38.

These two embodiments above are particularly advantageous in instances in which the tyre comprises a single carcass ply, the turn-up strand 40 or the auxiliary reinforcing element providing additional reinforcement in the shoulder zone of the tyre.

Furthermore, each multifilament strand may have a twist different from that of the other multifilament strand or strands so as to obtain a reinforcing element that is not twist-balanced.

It may also be possible to combine the features of the various embodiments described or envisaged above, as long as these are compatible with one another.

The invention claimed is:

1. A sidewall insert manufactured from a crosslinkable rubber composition comprising:
   a first elastomer consisting of polybutadiene having a Mooney plasticity ranging from 40 to less than 55 Mooney units;
   a second elastomer; and
   a carbon black having a specific surface area within a range of values extending from 15 m$^2$/g to 25 m$^2$/g and an oil adsorption number of compressed sample (COAN) within a range of values extending from 65 ml/100 g to 85 ml/100 g.

2. The sidewall insert according to claim 1, wherein the content of the first elastomer is greater than 50 phr.

3. The sidewall insert according to claim 1, wherein the content of the first elastomer is within a range of values extending from 50 to 80 phr.

4. The sidewall insert according to claim 3, wherein the content of the first elastomer is within a range of values extending from 55 to 75 phr.

5. The sidewall insert according to claim 4, wherein the content of the first elastomer is within a range of values extending from 60 to 70 phr.

6. The sidewall insert according to claim 1, wherein the second elastomer is a diene elastomer.

7. The sidewall insert according to claim 1, wherein the second elastomer is selected from the group consisting of polybutadienes, synthetic polyisoprenes, natural rubber, butadiene copolymers, isoprene copolymers and mixtures thereof.

8. The sidewall insert according to claim 1, wherein a content of carbon black is within a range of values extending from 30 to 100 phr.

9. The sidewall insert according to claim 8, wherein the content of carbon black is within a range of values extending from 35 to 80 phr.

10. The sidewall insert according to claim 9, wherein the content of carbon black is within a range of values extending from 40 to 75 phr.

11. The sidewall insert according to claim 10, wherein the content of carbon black is within a range of values extending from 40 to 60 phr.

12. A run-flat tire comprising a sidewall insert according to claim 1.

13. The run-flat tire according to claim 12 further comprising a carcass reinforcement comprising at least one carcass ply.

14. The run-flat tire according to claim 13, wherein the carcass reinforcement comprises a single carcass ply.

15. The run-flat tire according to claim 13, wherein the carcass ply comprises at least one reinforcing clement made of polyester.

* * * * *